Sept. 8, 1953  R. GOURDON  2,651,462
ITEM, TOTAL, AND REPEATED REGISTRATION CONTROL MECHANISM
Filed Dec. 9, 1947  7 Sheets-Sheet 2

INVENTOR
Robert Gourdon
By Corey & Jacobs
His Attorneys

Sept. 8, 1953 R. GOURDON 2,651,462
ITEM, TOTAL, AND REPEATED REGISTRATION CONTROL MECHANISM
Filed Dec. 9, 1947 7 Sheets-Sheet 3
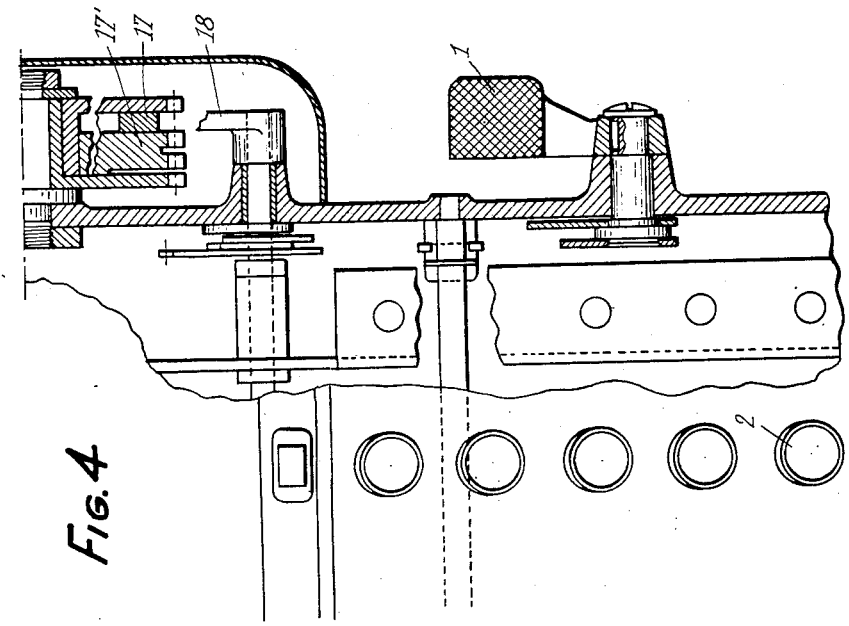
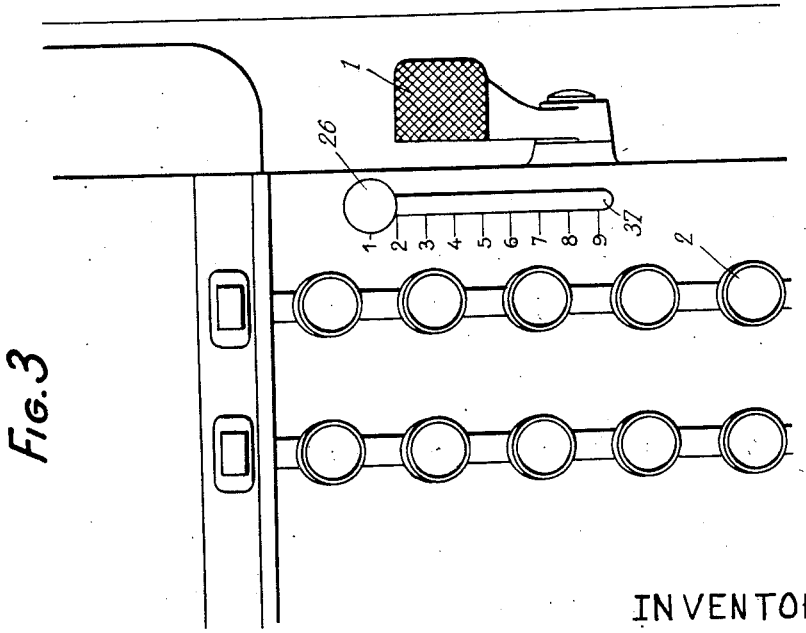
INVENTOR
Robert Gourdon
By Corey & Jacobs
His Attorneys

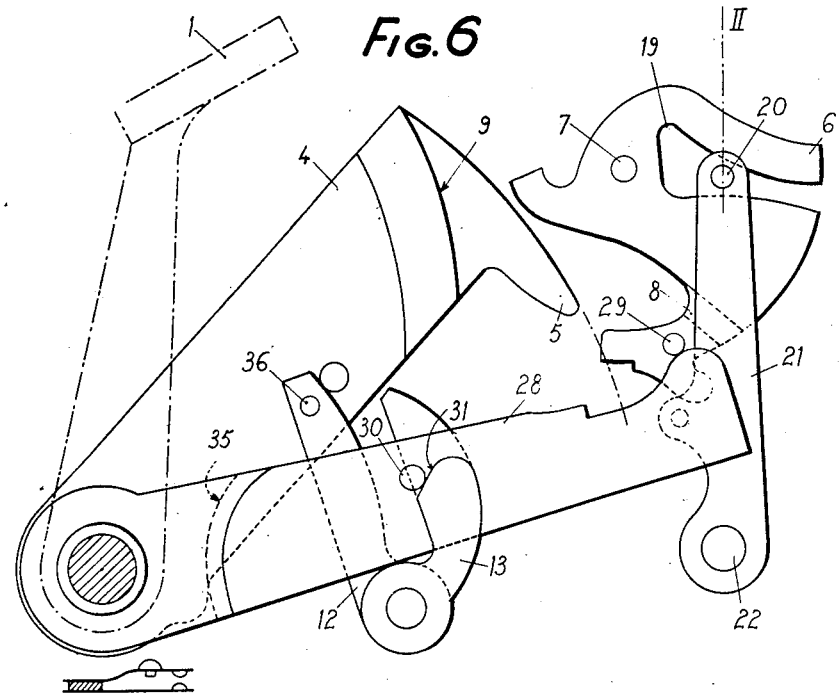

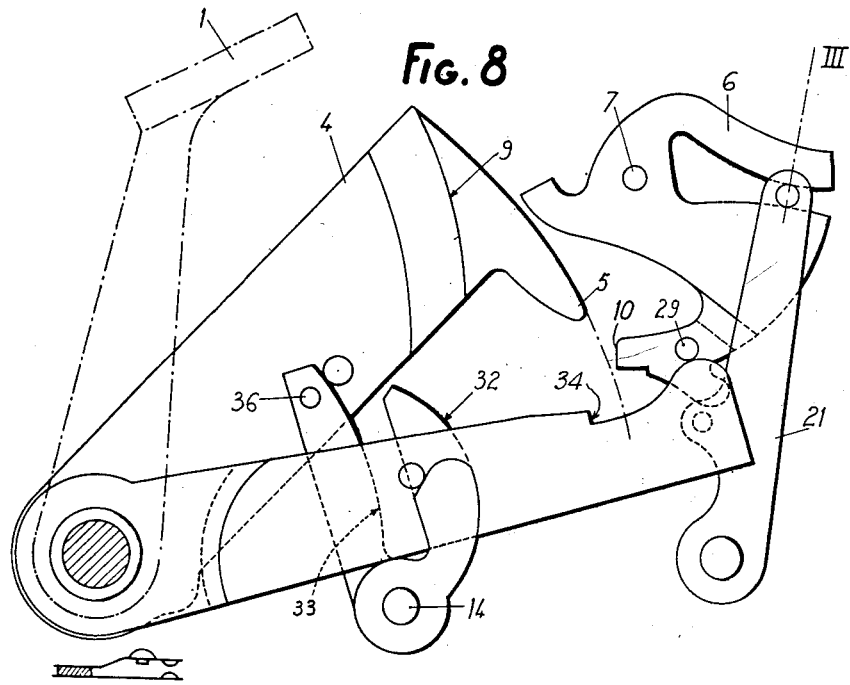
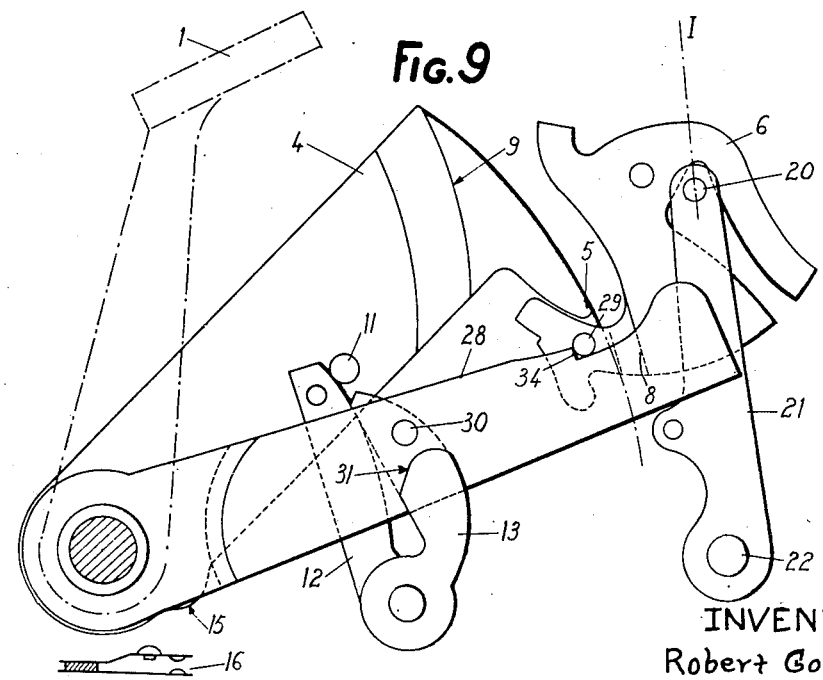

Sept. 8, 1953  R. GOURDON  2,651,462
ITEM, TOTAL, AND REPEATED REGISTRATION CONTROL MECHANISM
Filed Dec. 9, 1947  7 Sheets-Sheet 6
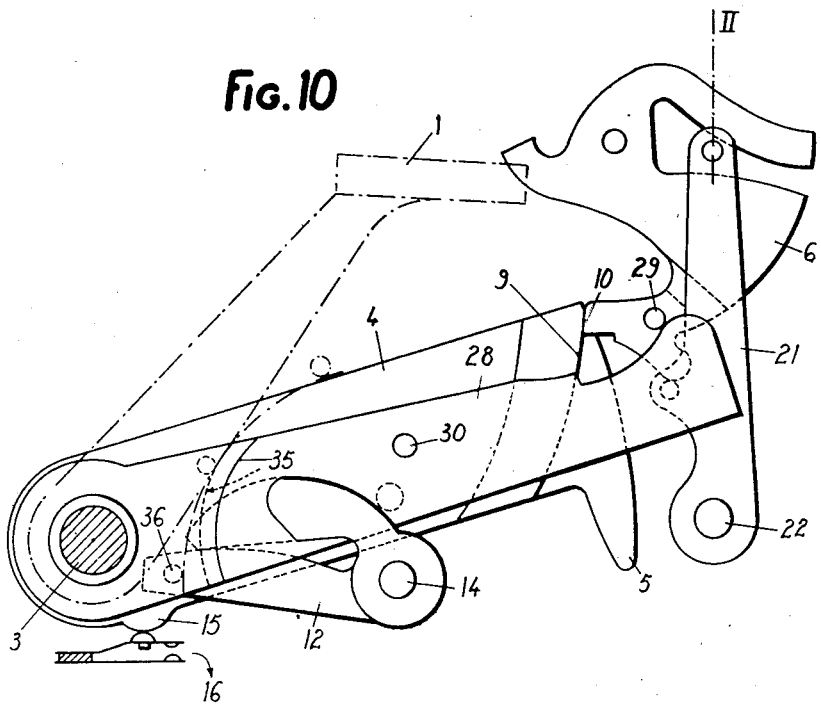
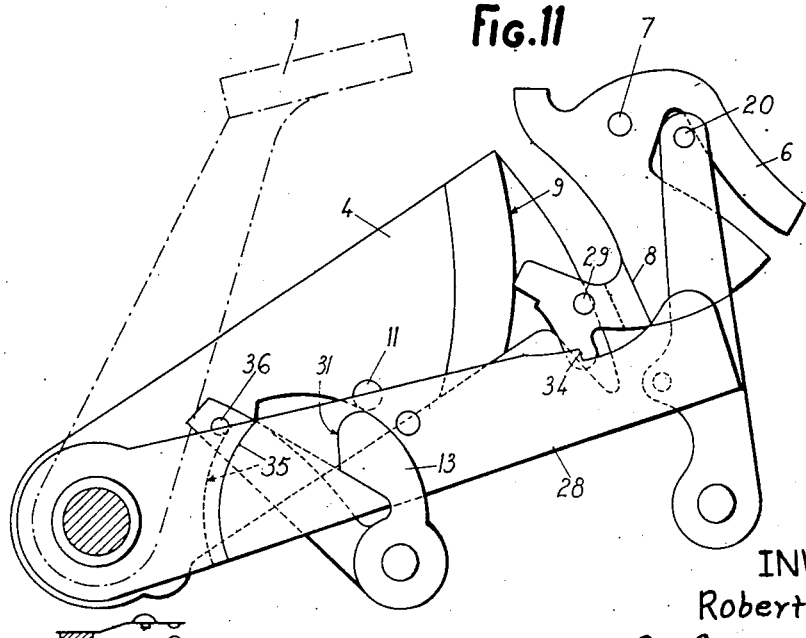
INVENTOR
Robert Gourdon
By Corey & Jacobs
His Attorneys INVENTOR
Robert Gourdon
By Corey & Jacobs
His Attorneys Patented Sept. 8, 1953

2,651,462

UNITED STATES PATENT OFFICE 2,651,462

ITEM, TOTAL, AND REPEATED REGISTRATION CONTROL MECHANISM

Robert Gourdon, Paris, France, assignor to Societe Anonyme dite Centre d'Etudes M. B. A. (Mecanique, Balistique, Armement), Paris, France Application December 9, 1947, Serial No. 790,596
In France December 12, 1946

9 Claims. (Cl. 235—62)

This invention relates to a device for registering partial accounts and aggregates in accounting machines such as, for example, cash registers.

One object of my invention is to enable such devices, by the addition of a supplementary key or other equivalent member, to automatically repeat, with the desired recurrence the final result registered which will thus form the product of this account by the desired recurrence. In other words, the arrangement according to the invention operates also as a multiplying device.

Another object of the invention is to provide an improved accounting machine in which a single manually operable member may be moved either to produce registration of a single item or partial account or registration of a total, the selection of a partial account or a total for registration being determined upon any given operation of the member in accordance with the preceding operation or non-operation of value indexing keys or tabulating members.

Another object of the invention is to achieve a simple, safely-operating, mechanism occupying the minimum of space and avoiding, as much as possible, the use of springs, so as to obtain an almost entirely positive operation of the apparatus.

A further object of the invention is to construct an apparatus mainly composed of thin shaped and pressed parts thus simplifying the construction of the apparatus and reducing the space occupied.

Other features and advantages of the invention will appear during the following description with reference to the enclosed drawings illustrating a single embodiment of the invention given solely by way of example.

In the drawings:

Fig. 3 is a plan view from above showing the registering key and the accounts repeating key together with some tabulating keys in a cash register;

Fig. 4 is a view similar to Fig. 3 the housing being broken away for showing in section several members of the device;

Figs. 6 to 11 are views showing one portion of the mechanism illustrated in Fig. 1, according to various operative positions.

Figure 1:
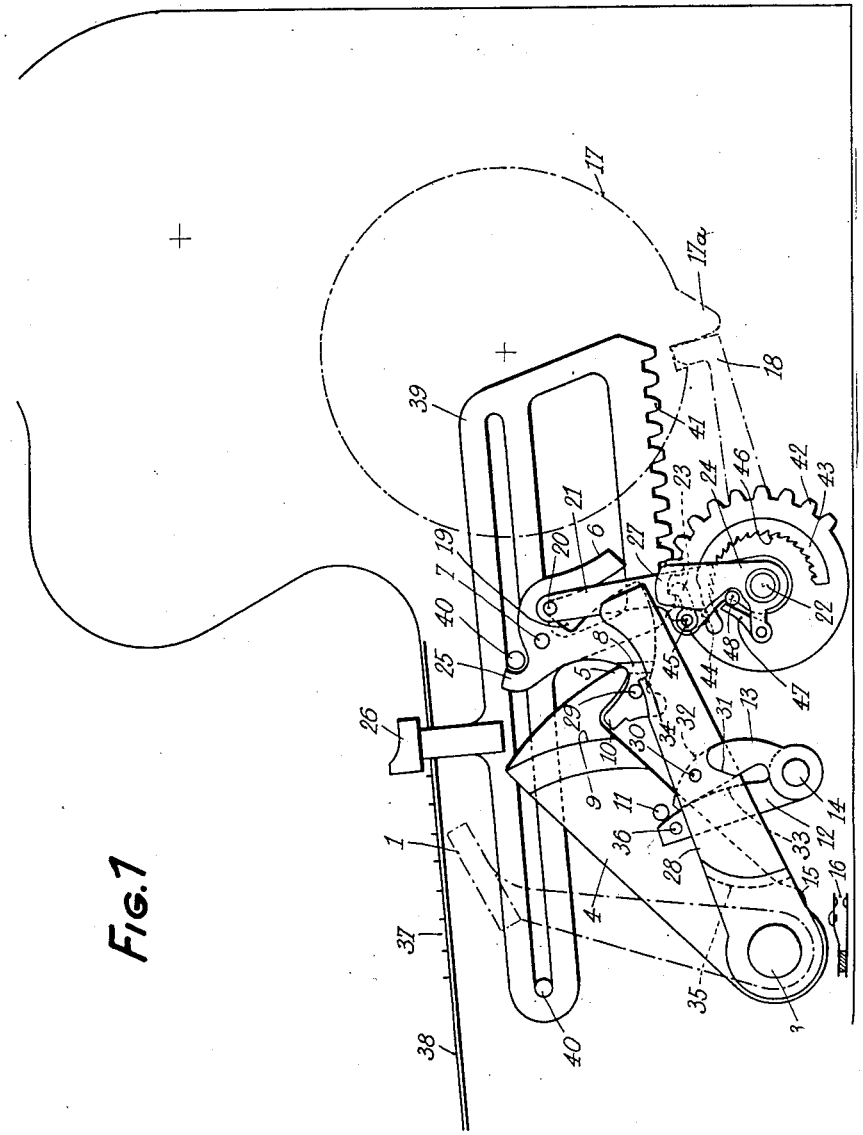
Fig. 1 is a lateral elevational view of a registering mechanism constructed according to the invention.
Figure 2:
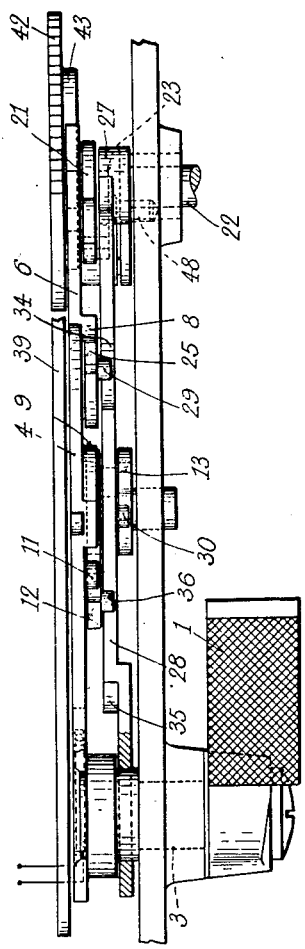
Fig. 2 is a plan view from above.

The following description relates to the invention as being more particularly applied to a cash register. It is understood however that the invention may be also applied to any other kind of accounting machines having total registering systems.

The following example, given in order to describe the details of the invention, refers more especially to a definite type of cash register described in my co-pending application filed on March 16, 1946 (Ser. No. 654,835) for Value Indexing Mechanism, now Patent No. 2,522,671, dated September 19, 1950, and my co-pending application filed on March 16, 1946 (Ser. No. 654,836) for Differential Actuating Mechanism for Calculating Machines, now Patent No. 2,568,616, dated September 18, 1951. The invention is not restricted, of course, to these types of cash register.

As will be particularly seen in Figs. 1 to 4, the registering device according to the invention comprises a key 1 acting both as registering member for partial accounts and for totals, the total being registered automatically by depressing key 1 without involving, in the meantime, any operation of tabulating members composed, for example of value indexing keys 2, shown in Figs. 3 and 4, which may control a tabulating mechanism similar to that described in my aforesaid co-pending application Serial No. 654,835, entitled Value Indexing Mechanism.

This key 1 is mounted on a shaft 3 and rigidly connected therewith, and a lever 4, hereinafter referred to as the first locking member, is also keyed on this shaft and arranged in a manner to be described presently. Thus the motions of this lever and of key 1 are integral.

Lever 4 carries firstly a locking nose 5 co-operating with a locking member 6, hereinafter referred to as the second locking member, which is movable about an axis 7 and is provided, for this purpose, with a shoulder 8 (see also Fig. 2) adapted to co-operate, in its locking position, with nose 5 of lever 4. The nose 5 and shoulder 8 are hereinafter identified as the first cooperating locking portions of the locking members.

The lever 4 also comprises a cam shaped edge 9 which may operatively engage, as shown further on, a lug 10 of the locking member 6, said cam surface being positioned in a different plane than that of the locking nose 5; in the same way, lug 10 is positioned in another plane than the locking shoulder 8 of this member. The cam-shaped edge 9 and lug 10 are hereinafter identified as the second cooperating locking portions of the locking members.

Further the lever 4 carries a stud 11 adapted to co-operate with either a lever 12 fixed on a shaft 14 or one arm of a forked lever 13 rotatably mounted on shaft 14. The shaft 14 is arranged to control both the total registering and printing operations by means of a mechanism not shown which is not included in the scope of the present invention. The lever 13 is referred to herein as the selection lever, since its position selects or determines, as described below, either an item registering operation or a total registering operation.

Finally, the lever 4 comprises, preferably on its lower edge, an extension 15 which, when the registering key 1 reaches the bottom end of its stroke closes the contact 16 inserted in the circuit controlling the motor operating the cash register recording mechanism, for example, by means of the device described in my aforesaid co-pending Patent No. 2,568,616. This device comprises a disc 17 shown in composite lines in Fig. 1 which has a counterclockwise cyclic movement and corresponds to disc 8 in Patent No. 2,568,161. The disc 17 cooperates with a locking arm 18 to be described later on. This disc 17 is integral with the control mechanism 17' for registering the values set by the tabulated members (see Fig. 4).

In the inoperative position, i. e. after the apparatus has performed a complete operation with totalization and also before any depressing of the registering key 1 and also before any tabulating key 2 has been depressed, the entire system is locked by the locking member 6 whose shoulder 8 co-operates with the locking nose 5 of the lever 4.

This locking member 6 has a suitably shaped cut 19 engaged by a stud 20 carried by an arm 21 rotatably mounted on a shaft 22; the arm 21 pivotally carries a clutch pawl 23, through which it is at times connected to an arm 24 fixed on the shaft 22 and also fixed to the aforesaid locking member 18.

The upper portion of member 6 carries also an abutment lug 25 provided to limit the movement of member 6 in the clockwise direction. The member 6 is biased for clockwise rotation about the pivot 7 to move the lug 25 into engagement with a pin 40. This biasing may be accomplished either by gravity or by a suitable spring (not shown).

As explained later on the locking member 6, according to the operational step, may either be driven by stud 20 of arm 21 or become a driving member itself to control the angular displacement of said arm 21. In the normal position, clutch pawl 23 is in engagement with a lateral extension 27 carried by member 24, said pawl 23 being provided to rigidly connect, in this position both levers 24 and 21 together.

On shaft 3, on which are keyed the registering key 1 and the lever 4 is also loosely mounted another arm 28, hereinafter identified as the selection preparation lever, which normally tends (under the action of any spring not shown) to engage a stud 29 carried by the locking member 6.

Arm 28 carries a stud 30 or similar member protruding laterally. When arm 28 is lowered during the rotation of locking member 6 in an anti-clockwise direction to the position of Figure 6, due to the action exerted by stud 29 on arm 28, the aforesaid stud 30 bears against lever 13 to move it away from lever 12. A spring not shown, is provided for normally urging both levers against each other in the inoperative position shown in Fig. 1.

The fork-shaped lever 13 straddles arm 28 as shown in Figs. 1, 2 and 6 to 11; said stud 30 being adapted to bear against the cam surface 31 of the front portion of said lever 13 while the other prong of the lever 13 has a cam surface 32 on which, in some circumstances, the stud 11 of arm 4 may act, as will be presently disclosed.

The other lever 12 has a surface 33 concentrical with shaft 3 so that when the arm 4 rotates with this shaft, the stud 11 of said arm 4 cannot impart any rotational movement to lever 12, provided that lever 13 has been previously moved aside to allow the passage of said stud 11. It will be remarked that lever 12, keyed on shaft 14 controlling the total registering and printing operation, is also urged by a spring so that surface 33 is always contacting stud 11.

If, on the contrary, lever 13 has not been moved away from arm 12, stud 11 cannot penetrate between the two levers and thus follow the surface 33 concentrical with shaft 3, but it is compelled to bear against the cam surface 32 provided on the front portion of arm 13, thus (Figs. 11 and 10) causing the latter to rotate in an anti-clockwise direction together with the lever 12 against which it bears. In this manner, the total registering and printing operations are performed, through the medium of shaft 14 and any suitable mechanism, not shown and outside the scope of the present invention.

Moreover, the lever 28 has a step or catch 34 adapted to be engaged by stud 29 of the locking arm 6, as shown in Fig. 9, to interlock arm 28 and member 6. In this position, the locking member 6 is prevented from rotating in a clockwise direction to its inoperative position and, therefore its shoulder 8 which extends laterally from said lever 6, will not lock the lug 5 of arm 4, thus allowing key 1 to be depressed anew, for example, for taking a total. The stud 29 and shoulder 34 are hereinafter referred to as first cooperating abutments.

In order to permit, however, after the total taking operations are completed, the various members of the mechanism to resume their inoperative position shown in Fig. 1, in which these members are locked to one another, it is necessary to prevent, when key 1 is resuming its upper or non-depressed position, the locking of lever 28 and locking member 6 through the medium of stud 29 and catch 34.

To this end, lever 28 has on its back surface a cam-shaped shoulder 35 adapted to be engaged by a stud 36 carried by the upper portion of lever 12 when the latter is urged upward by the action of its return spring to the inoperative position shown in Fig. 1. During this operation, as shown in Fig. 11, the stud 36 bears against the cam 35 and momentarily holds the catch 34 out of the path of stud 29, as shown in Fig. 11, thus allowing the locking member 6 to complete its clockwise movement to its inoperative position shown in Fig. 1. The shoulder 35 and stud 36 are hereinafter referred to as second cooperating abutments.

It has been shown that the mechanism according to the invention includes an account-repeating key 26. The latter may slide into a slot 37 provided in the housing 38 of the apparatus and having sidewise a number scale (comprising in the example shown in Fig. 3, members 1 to 9) indicating how many times the accounts may be repeated.

If, for instance, key 26 is moved opposite the scale-division 4, as will be further explained in the description of the operational sequence of the apparatus, the account will be automatically repeated four times, which means that the same account will be multiplied by 4. Of course, the scale provided on the edge of slot 37 may comprise a number of divisions other than that indicated.

The repeater key 26 is integral with a slide 39 guided by means of cross-pins 40 carried by the frame or housing of the apparatus. This slide is moreover integral with a rack 41 meshing with a partially toothed wheel 42, loosely mounted on shaft 22. One face, in the example shown the front face, of the toothed wheel 42, carries an element 43 acting as a cam element for the lug 44 of pawl 23 which is mounted by means of a pin 45 on the arm 21. Element 43 has an internal set of ratchet wheel teeth 46 adapted to be engaged by a pawl 47 carried by the arm 24. This pawl is normally urged by a spring (not shown) out of engagement with ratchet 46 and against an abutment 48 integral with the frame. When arm 24 is rotated clockwise from the position shown in Fig. 1, pawl 47 is forced outwardly by abutment 48 to a position where it may engage ratchet 46.

In the position shown in Fig. 1, i. e. in the inoperative position, the angular position of wheel 42 is such that cam 43 has not engaged yet the extension 44 of the pawl 23 and the latter is still engaged with the protruding portion 27 of member 24. Also, in this position, the ratchet 46 is not aligned with pawl 47, so that even though the arm 24 is rotated clockwise through a small angle, ratchet 46 is not operated.

If, contrariwise, the key 26 has been operated towards the left (see Fig. 1) which causes wheel 42 to rotate and also therewith the cam shaped element 43 in an anti-clockwise direction, the extension 44 of pawl 23 will be moved by the lift portion of cam 43 and pawl 23 will be disengaged from portion 27 of member 24, thus disconnecting the arms 21 and 18.

Thereafter, each time the account set on the indexing keys is repeated, the shaft 22, driven by boss 17a on disc 17 acting through arm 18, makes a partial rotation in a clockwise sense, causing pawl 47 to engage ratchet wheel 46 and step the wheel 42 around clockwise, thereby moving rack 41 to the right and restoring key 26 step by step to its normal or inoperative position.

Figure 12:
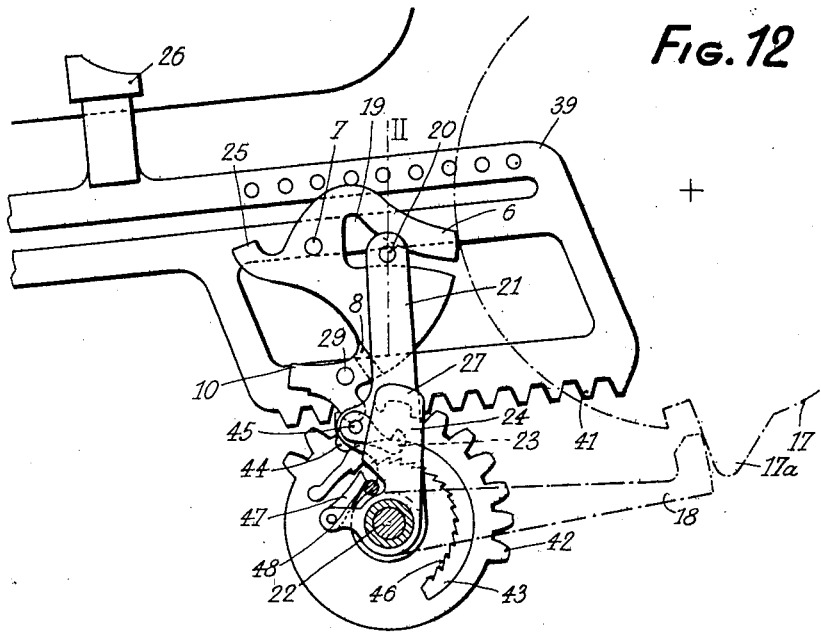
Figs. 12 and 13 are views showing another portion of this mechanism in two different positions.

In Fig. 12, there is shown how the lever 18 operates for unlocking the disc 17 integral with the differential actuating mechanism, by means of the device already described in my aforesaid co-pending patent application Serial No. 654,835 which it is well to remind to facilitate the thorough understanding of the mechanism according to the invention. This device for unlocking the disc 17 by means of lever 18 is constituted by an arm 49 rigidly secured together with the lever 21 and thereby connected through pawl 23 to the lever 18; this lever 49 being actuated by a stud 50 carried by a sliding member 51 provided with rise-forming notches 52 against which may bear members 54 carried by keys 2. In the position shown Fig. 5, one key has been depressed, thus displacing toward the right the sliding member 51 and rotating the arm 49 in a clockwise direction, thereby unlocking disc 17.

Now the above described mechanism will be operatively analyzed to show how it fulfills in a simple way the above stated conditions.

For this purpose, reference will be made more particularly to Figs. 6 to 13. Several cases will be examined, viz:

I. Partial account registering;
II. Total registering;
III. Repetition and multiplication of accounts.

Operations I and II always take place in the same order, i. e. a total can be had only after a partial account has been registered, which registration may be single.

I. Registration of a partial account

The number to be registered is tabulated by operating the corresponding tabulating keys 2; this operation will in the first place (see Fig. 5) unlock the disc 17 of the control mechanism by causing lever 18 to rotate.

This rotational movement of lever 18 causes a corresponding movement of member 24 rigidly secured on a common shaft 22 with said lever 18. The rotational movement of member 24 whose lateral extension 27 is in engagement with pawl 23 carried by lever 21 (see Fig. 1) will cause lever 21 to rotate in a clockwise direction so as to take the position designated by II on Figs. 6 and 13.

During this operation, stud 20 of arm 21, by engaging notch 19 of locking member 6 caused the latter to rotate about its axis 7 in an anti-clockwise direction.

The rotational movement of member 6 will unlock lever 4 integral with key 1, because the locking lug 5 of this lever is disengaged from the extension or shoulder 8 of member 6.

Under these conditions, it is now possible to fully depress the registration key 1 since the arm 4 may pass in front of member 6, along the path shown by lines in the drawing (Fig. 6), forcing the member 6 slightly farther counter-clockwise, if necessary.

Figure 13:
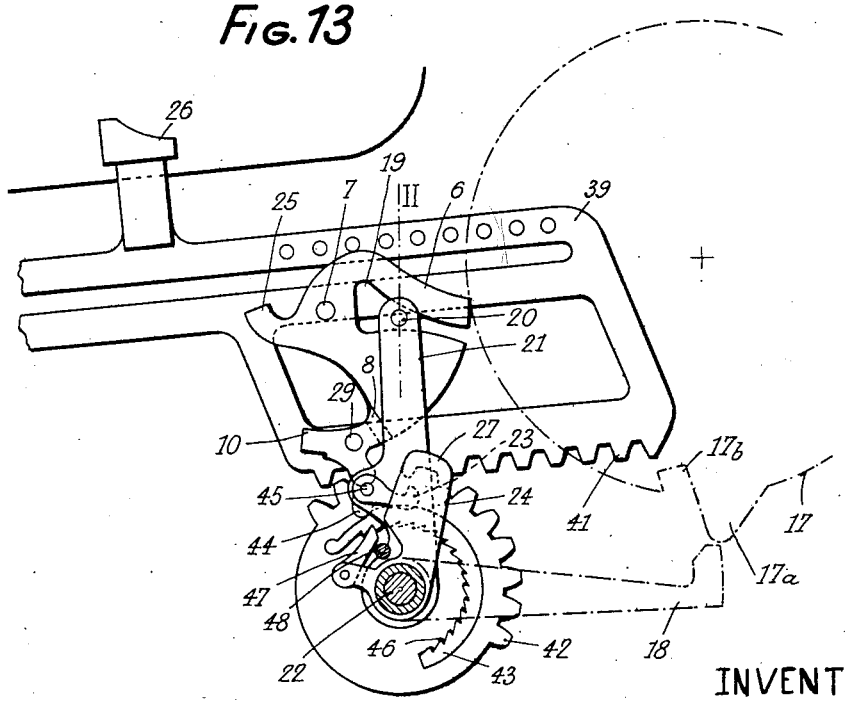

During the same operation, the locking member 6 was moved from the position shown in Fig. 1 to that of Figs. 6 and 13. The stud 29 carried by this member has actuated element 28 and rotated it in a clockwise direction, thus moving lever 13 away from lever 12 owing to the action exerted by stud 30 of lever 28 on the cam-surface 31 of arm 13.

After a tabulating key 2 has been depressed and the various elements of the mechanism are moved into the position shown in Fig. 6 in which the key 1 may be depressed for registering a partial account; the key 1 is depressed and the elements are moved to the position shown in Fig. 7. During this operation, the lever 4 is fully depressed and, during its motion, causes member 6 to slightly rotate in an anti-clockwise direction by co-action of the lateral cam element 9 with the nose 10 of lever 6. Immediately after this slight rotation the lever 4 is locked in its depressed position by the lug or nose 10 of member 6 which under the influence of its bias has resumed its position shown in Fig. 7 from which it had been slightly moved away.

During the depression of key 1, the stud 11 carried by lever 4 was interposed between the two arms 12 and 13 which, as explained herein above (position of Fig. 6), have been moved away from each other and said stud 11 moved along the surface 33 concentrical with shaft 3; under these conditions, the movement of this stud 11 had no consequence upon lever 12 which remained in the position shown in Figs. 6 and 7.

In other words, during this movement which corresponds to the registration of the partial account, the shaft 14 on which lever 12 is keyed for controlling the total taking operations has not been operated.

At the same time, the lever 4 through its boss 15, has closed the contact 16 provided for establishing the circuit of the motor driving the partial account registering shaft, through the medium of the mechanism 17' (see Fig. 4) in which the locking disc 17 is comprised.

On completion of this partial account registration operation the boss 17a carried by disc 17 engages the end of lever 18, as shown in Fig. 13, thus causing this lever to rotate slightly further in a clockwise direction. This movement involves a corresponding rotary motion of arm 21 in the same direction, this arm 21 being moved to the position shown at III, Fig. 8. The mechanical connection between lever 18 and arm 21 which produces this simultaneous movement includes shaft 22, arm 24 fixed on that shaft, lateral extension 27 of arm 24, and pawl 23 mounted on lever 21 and held in engagement with extension 27. When lever 21 passes from the Fig. 7 position to position III (Fig. 8) the locking member 6 is caused to rotate slightly further in an anticlockwise direction, thus moving lug 10 away from the extremity of arm 4 toward the right and unlocking the arm 4. Then, the arm 4 which is urged by a spring not shown acting continuously upon the assembly of key 1 and arm 4 may resume its upper position. Fig. 8 corresponds to this operational step.

As lever 21 moves from the position of Fig. 7 to position III, the lever 49 (Fig. 5) moves clockwise with lever 21. Lever 49 acts on a stud 50' carried by bar 51' and drives the latter to the right, rotating the lever 53 and driving bar 51 back toward the left. This movement of bar 51 causes the inclined portion of notch 52 to raise the pin 54, thereby lifting the key 2.

As the arm 4 moves back to its upper position, the switch 16 is opened, cutting off the supply of energy to the motor driving disc 17. Substantially simultaneously, the boss 17a thereof stops bearing against arm 18 because the end of this arm registers now with the locking recess or cut 17b of said disc and arm 18 may thus freely rotate in an anti-clockwise direction under the action of a return spring, thus causing the locking of disc 17, on completion of the registration operation, by means of the recess 17b. This anti-clockwise movement of arm 18 until its locking position into notch 17b of disc 17 is reached causes, through the intermediary of the pawl 23 engaged as previously explained with the lateral extension 27 of lever 24, the arm 21 to resume its inoperative position I, shown in Fig. 9. At the same time, the locking member 6 moves in a clockwise direction under the influence of its bias, its clockwise movement at first being limited by stud 20 carried by said lever 21. During this movement of member 6, the lever 28, which bears continuously against the stud 29 of member 6, has been lifted and its stud 30 has moved out of engagement with the lever 13 which will be thus closed upon lever 12 (see Fig. 9). However, both members 6 and 28 will not resume exactly their position of Fig. 1 because at a given moment stud 29 of member 6 has engaged a notch or shoulder 34 of lever 28 (see Fig. 9) thus interlocking both elements 6 and 28. In this position which corresponds to Fig. 9 member 6 has not completely resumed its position as in Fig. 1 and the shoulder 8 extending laterally on this member 6 has not been brought to register with the lug 5 of arm 4. Thus, without depressing other tabulating keys, it is possible to depress again key 1 by means of lever 4 for performing as explained hereinafter, a total registering operation.

If key 1 were not re-depressed immediately, and if new tabulating keys were depressed for performing a new partial accounting operation, the same operational sequence as that formerly explained would be effected.

II. *Total registering*

Now it will be assumed that key 1 is again depressed without having operated the tabulating keys 2; the consequence will be the registering of the total of the preceding partial account or accounts. This position, after key 1 has been depressed anew, corresponds to that shown in Fig. 10 (in which the key is not fully depressed and cam 9 is not sufficiently depressed to release and be latched by nose 10 of member 6. In this case, as both levers 12 and 13 have not been moved away from each other as in Fig. 7 since lever 28 has not been lowered by the anti-clockwise rotation of locking member 6, it has not been possible for stud 11 of member 4 to penetrate between these two levers and this stud 11 has been therefore compelled to follow the cam surface 32 of lever 13, thus causing lever 13 to rotate in an anti-clockwise direction. This lever 13 through its engagement with lever 12, causes the latter to rotate in the same direction. As lever 12 is keyed on the total registering shaft 14, the latter is thus operated and the total registering operations will be made through any suitable mechanism connected with shaft 14.

During this same operation, and after both arms 12 and 13 have started rotating in a counterclockwise direction the cam surface 9 will act upon lug 10 of member 6 and cause same to rotate anti-clockwise until it reaches the position shown in Fig. 10. This rotational movement of member 6 has moved, for the same reasons as explained hereinabove, the arm 21 to its position II, with the same consequences on lever 18 as before, i. e. the release of disc 17 comprised in the control mechanism for the total registration. The interlocking of lever 4 through lug 10 of member 6 also takes place as before upon further depression of key 1 beyond the Fig. 10 position.

As the lever 4 moves downwardly, the lever 28 is moved downwardly with it. During the initial part of the downward movement of lever 4, the accompanying downward movement of lever 28 is accomplished by engagement of the stud 29 on the member 6 with the cooperating surface of lever 28. As the downward movement of lever 4 continues, however, the stud 36 on the arm 12, following the path indicated in dot-dash line in Fig. 10, engages the upper surface of lever 28 and thereafter engages the upper end of the cam surface 35 on that lever (as shown in Fig. 11). When the stud 36 engages lever 28, it becomes the driving member forcing the downward movement of lever 28, and causes a temporary separation of lever 28 from stud 29 on member 6. This separation of lever 28 from stud 29 is of no importance during the downward movement of the parts, but becomes important during the upward movement of the parts, to be described below. As the downward movement of lever 4 continues, the stud 36 again separates from cam surface 35 and the stud 29 again takes over the function of driving the lever 28 downward.

As the downward movement of key 1 continues, the parts pass through the intermediate position illustrated in Figure 10 to a position in which the boss 15 on the arm 4 engages and closes the switch contact 16 connected in the circuit of the motor controlling the registering mechanism 17' (Fig. 4). At that time, all the parts (except arms 12 and 13) have substantially the same positions as shown in Fig. 7, and the lever 4 is locked by the lug 10 on the member 6.

The release of the parts from the position last described takes place in a manner similar to the releasing operation described above in connection with the registration of a partial account. That is to say, the projection 17a on the disc 17 engages the end of lever 18 and causes a slight clockwise movement of arm 21, thereby carrying the projection 10 out from in front of the upper corner of the lever arm 4, so that the various return springs can restore the parts to their original positions. During this return movement of the parts, a position is reached where the stud 36 on arm 12 is engaged by the cam surface 35 on lever 28, and holds the lever 28 out of engagement with the stud 29 on member 6. This separation of stud 29 from lever 28 causes the stud 29 to pass over the notch 34 in lever 28. Therefore the parts do not stop in the position of Fig. 9, with the stud 29 engaging the notch 34, but instead pass on back to the position of Fig. 1. In that position, the side shoulder of the member 6 locks the lug 5 on the lever arm 4, thereby preventing depression of the key 1. In other words, after a total registration the total key 1 may not be again depressed unless the tabulating or value indexing key 2 is first operated.

III. Repetition multiplication of accounts

It will be now assumed that, after first setting an item on one or more of the value indexing keys 2, the repeating or multiplying key 26 has been operated and key 1 depressed to close the motor circuit. When key 26 is moved toward the left (as shown in Fig. 12), it causes gear 42 to rotate under the action of rack 41, as explained hereinabove. This rotational movement of gear 42 also causes cam member 43 integral therewith to rotate in an anti-clockwise direction. Cam member 43 thus actuates the extension 44 of pawl 23 and moves the engaging member of this pawl away from the lateral extension 27 of arm 24, thus disconnecting levers 18 and 21. When levers 18 and 21 are disconnected, the lever 18 is prevented from immediately resetting in the notch of disc 17, because said lever 18 is rigidly mounted with lever 49 (see Fig. 5) on the common shaft 22. Under these conditions the lever 18 cannot move in counterclockwise direction until stud 50 has permitted the lever 49 to move in said counterclockwise direction.

Under these conditions, boss 17a of disc 17 will cause reciprocation of the end of lever 18, but the latter will not drive the arm 21 from position II (Fig. 12) to position III as previously described (see Fig. 8). It will be remembered that when lever 21 passes from position II to position III it causes the depressed tabulating key 2 to be released and move upwards. Contrariwise, in the present case these keys will remain in their depressed position, the switch 16 will remain closed, and the motor will keep the disc 17 running rapidly enough so that the end of arm 18 will not move into recess or notch 17b of disc 17, thus permitting repeated registration of the indexed value; this corresponds to the position of Fig. 12. Each time disc 17 rotates, the arm 18 is reciprocated by boss 17a, the ratchet is moved one step clockwise, and the item set on the indexing keys is registered once. The repeated registration will take place until pawl 23 resumes engagement with the lateral extension 27 of arm 24, which will take place progressively as will be explained presently with reference to Fig. 13.

When boss 17a of disc 17 actuates the end of lever 18 (see Fig. 13) the arm 24, which rotates integrally with said lever 18, rotates in a clockwise direction thus causing pawl 47 to engage one tooth of ratchet wheels 46; in this manner, each time boss 17a passes the end of lever 18, the toothed wheel 42 is advanced one tooth until it has rotated sufficiently so that cam 43 moves out from under extension 44 to allow pawl 23 to engage again the lateral extension 27 of lever 24.

Now, conditions are identical to those set forth above, in which the rotational movement of lever 18, owing to the action of boss 17a, causes lever 21 to rotate in the same direction from position II to position III, which determines as previously said, the release of the depressed keys and the stopping of the motor to allow the locking of the registration mechanism comprising disc 17, when the end of lever 18 registers with the notch 17b of said disc.

From the foregoing it will be seen that by means of a very simple mechanism occupying a very small space it is possible to perform various operations such as those described above, from the mere registration of a partial account to the total registration of one or several accounts with, if desired, the automatical repetition, i. e. multiplication of some partial items. The complete sequence of operation of the apparatus will now be briefly reviewed. Fig. 1 shows most of the parts in their inactive positions. The value indexing keys 2 (Fig. 5) are not depressed, the control key 1 is not depressed and the repeat key 26 is at its zero position. The control key 1 is interlocked through the parts 5, 8 of arm 4 and member 6, respectively, so that the control key 1 cannot be depressed until one or more of the value indexing keys 2 are depressed.

Figure 5:
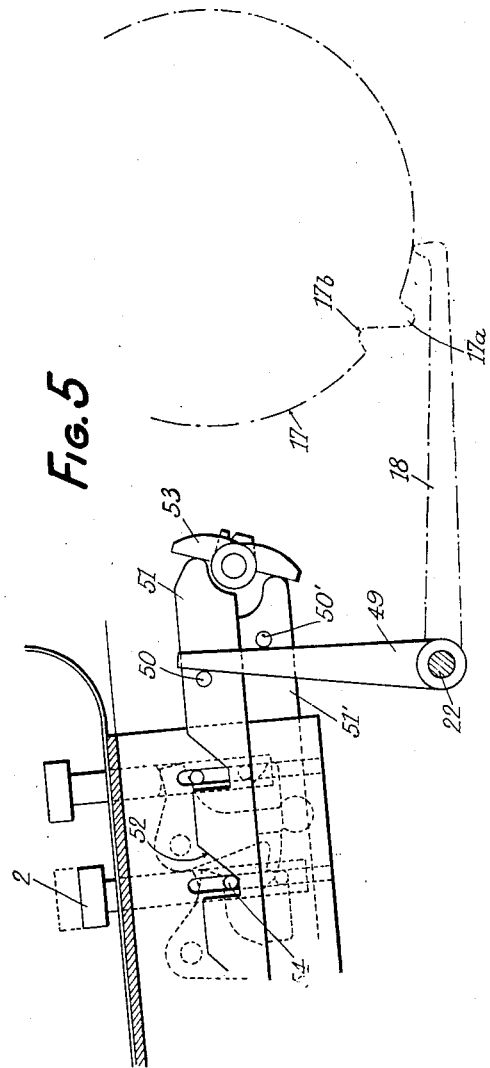
Fig. 5 is a fragmentary and lateral elevational section of the device for driving the shaft of the locking device of the accounts registering device.

Starting with the parts in the Fig. 1 position, a value indexing key 2 is depressed as shown in Fig. 5. This releases the differential actuating mechanism 17 by the movement of arm 18, and acts through shaft 22 and arm 21 to rotate the member 6 and release the interlock 5, 8. The parts now have the positions shown in Fig. 6.

The control key is now operated to register the value set on the indexing keys. When the control key 1 is depressed, the parts move to the positions shown in Fig. 7, and the switch 16 is closed to energize the motor for driving the differential actuating mechanism. The key 1 and arm 4 are latched down at 9, 10. At the end of one cycle of rotation of the differential actuating mechanism 17, the lug 17a kicks the arm 18, rotating arm 21 slightly clockwise to release the latch 9, 10, allowing the parts to return to the positions shown in Fig. 9 under the influence of their biasing springs. Interlock 5, 8 is not re-established, but is prevented by engagement of the parts 29, 34. Registration of subsequent items may be carried out by setting the value indexing keys and operating the registration key 1. The parts move from the Fig. 9 position to the Fig. 6 position when the value indexing keys are set and then follow the sequence described above.

When it is desired to register a total after one or more items have been registered, it is only necessary to depress the control key 1. The parts then move from the Fig. 9 position to the Fig. 10 position. Since no value indexing keys are depressed, lever arm 13 is not moved out of the path of pin 11 before the key 1 is depressed. Therefore pin 11 moves the lever arm 13 counter-clockwise and thereby drives the total registering mechanism. The latch down apparatus acts as before at 9, 10 and is released in the same manner. During the releasing action, the cam 35 and pin 36 are effective to prevent engagement at 29, 34, so that the interlock at 5, 8 is re-established. The parts are then back in their original inactive positions as shown in Fig. 1.

When it is desired to repeat the registration of the same item a number of times, that item is first set on the value indexing keys. As before, this releases the differential actuating mechanism 17 and the interlock 5, 8. The repeat key 26 is then set for the desired number of repetitions, moving the parts to the positions of Fig. 12. This motion interrupts the latch releasing connection between arm 18 and arm 21. It also brings the rack 46 opposite the pawl 47. The control key 1 is now depressed and latched down, starting the motor driving the differential actuating mechanism. Each time the differential actuating mechanism rotates once, the lug 17a kicks the end of arm 18 causing the pawl 47 to drive the rack 46 and hence to step the repeater key back toward its normal position. When the repeater key reaches its normal position, the latch releasing connection between arm 18 and arm 21 is restored so that on the next actuation of arm 18 by the lug 17a, the latch is released.

In the preceding description, it is indicated that the differential actuating mechanism 17' and its associated registration mechanism are motor driven. It is apparent that my invention may equally well be applied to other types of accounting machines in which the differential actuating mechanism and registration mechanism are operated by a hand crank, for instance. In such an arrangement, the key 1 as described herein would be used only for total registration. For registering partial accounts, the usual hand crank would be used.

As mentioned above, the invention has been described herein as embodied in mechanism suitable for use in connection with a cash register. It should be readily apparent to those skilled in the art that the invention may equally well be applied to accounting machines wherein it is desired to register partial accounts either singly or repeatedly and also to register totals.

What I claim is:

1. A device for registering partial accounts and their totals in an accounting machine and for repeating an account a predetermined number of times, comprising account registering means, total registering means, a registration key, a first rotatable locking member keyed on the same shaft as said registration key and provided with a stud, a second rotatable locking member cooperating with said first locking member for locking said registration key in its inoperative position and momentarily in its actuated position, a stud carried by said second locking member, a preparation lever for account registration, said lever being freely mounted on the shaft on which are keyed the registration key and the first locking member and being provided with a stud preparing account registration and with a shoulder capable of being engaged by the stud carried by said second locking member after a first actuation of said registration key following a total registration, a lever controlling the position of the second of said locking members and operatively connected with said account registering means, a selection lever for selecting the operation to be performed by said registration key, said selection lever being freely mounted on the shaft controlling said total registering means and being provided with a cam shaped portion on which acts the stud carried by said preparation lever when said registration key is actuated for the first time following an account or a total registration and also provided with another cam shaped portion on which acts the stud carried by said first locking member when the stud carried by said preparation lever does not act on the first cam shaped portion of said selection lever, a control lever for the total registration which is provided with a bearing surface concentric with the shaft of said registration key and of said first locking member and against which bears said selection lever when the latter has not departed from said control lever due to the action of the stud carried by said preparation lever on the first cam shaped portion of said selection lever, an adjustable repeater key, an unlocking member operatively connected to said repeater key for avoiding the locking of said account registering means at the end of the registering cycle until the last repetition has been performed, and means for progressively returning said unlocking member to its normal position.

2. A device for registering partial accounts and their totals in an accounting machine and for repeating an account a predetermined number of times, comprising account registering means, total registering means, a registration key, a first rotatable locking member keyed on the same shaft as said registration key and provided with a stud, a second rotatable locking member cooperating with said first locking member for locking said registration key in its inoperative position and momentarily in its actuated position, a stud carried by said second locking member, a preparation lever for account registration, said lever being freely mounted on the shaft on which are keyed the registration key and the first locking member and being provided with a stud preparing account registration, with a cam shaped portion, and with a shoulder capable of being engaged by the stud carried by said second locking member after a first actuation of said registration key following a total registration, a lever controlling the position of the second of said locking members and operatively connected with said account registering means, a selection lever for selecting the operation to be performed by said registration key, said selection lever being freely mounted on the shaft controlling said total registering means and being provided with a cam shaped portion on which acts the stud carried by said preparation lever when said registration key is actuated for the first time following an account or a total registration and also provided with another cam shaped portion on which acts the stud carried by said first locking member when the stud carried by said preparation lever does not act on the first cam shaped portion of said selection lever, a control lever for the total registration which is provided with a stud capable of engaging the cam shaped portion of said preparation lever for determining further a relocking of said registration key after a total registration and with a bearing surface concentric with the shaft of said registration key and of said first locking member and against which bears said selection lever when the latter has not departed from said control lever due to the action of the stud carried by said preparation lever on the first cam shaped portion of said selection lever, an adjustable repeater key, an unlocking member operatively connected to said repeater key for avoiding locking of said account registering means at the end of the registering cycle until the last repetition has been performed, and means for progressively returning said unlocking member to its normal position.

3. A device for registering partial accounts and their totals in an accounting machine and for repeating an account a predetermined number of times, comprising account registering means, total registering means, a registration key, two rotatable locking members cooperating one with the other for locking said registration key in its inoperative position and momentarily in its actuated position, a locking lever for said account registering means, a control lever controlling the position of one of the said locking members, a pawl system capable of connecting said control lever with and said locking lever, means for controlling said total registering means after two successive operations of said registration key without registration of a new account between these two successive operations, an adjustable repeater key, a disc operatively connected to said repeater key and mounted on the same shaft as said locking and control levers, a cam shaped member carried by said disc and capable of cooperating with said pawl system, ratchet-wheel teeth formed on said cam shaped member, a second pawl capable of being brought into engagement with said ratchet-wheel teeth, a piece keyed on the shaft on which is also keyed said locking lever and carrying said second pawl, a stationary stud capable of engaging said second pawl each time said locking lever is rotated by said account registering means for bringing into engagement said second pawl and said ratchet wheel teeth in view of returning gradually said disc to its initial position and of reestablishing the connection between said control lever and said locking lever.

4. In an accounting machine, item registering means, total registering means, registration key, value indexing keys having normal inoperative positions and settable in operative positions, means operatively connecting said registration key to said total registering means including a member biased to a normal position in which it transmits motion between said registration key and said total registration means and movable to a second position where it is ineffective to transmit such motion, means operatively connected to said value indexing keys and effective upon setting of any of said indexing keys in its operative position to move said member to its second position, means effective upon setting of any of said indexing keys and subsequent operation of said registration key to operate said item registering means and means effective after an operation of said item registering means to restore said indexing keys and said member to their normal positions, so that upon a succeeding operation of said registration key without intervening setting of said indexing keys, said total registering means will be operated.

5. In an accounting machine, item registering means, total registering means, a registration key, value indexing keys having normal inoperative positions and settable in operative positions, means operatively connecting said registration key to said total registering means including a member biased to a normal position in which it transmits motion between said registration key and said total registration means and movable to a second position where it is ineffective to transmit such motion, means operatively connected to said value indexing keys and effective upon setting of any of said indexing keys in its operative position to move said member to its second position, means effective upon setting of any of said indexing keys and subsequent operation of said registration key to operate said item registering means and to lock said registration key in its operated position until operation of the item registering means is completed, and means effective after an operation of said item registering means to restore said indexing keys and said member to their normal positions and to release said registration key so that upon a succeeding operation of said registration key without intervening setting of said indexing keys, said total registering means will be operated, an item repeater key having a normal position and movable therefrom to an active position, a repeater key reset mechanism for moving the repeater key from its active position back to its normal position, and means operated by the repeater key upon movement thereof to its active position to render said restoring and releasing means ineffective and to operatively connect said reset mechanism to the item registering mechanism for operation thereby, so that the registration key remains in its operated position until the registering of the indexed item is repeated, whereupon the repeater key is reset to its normal position.

6. An accounting machine as defined in claim 5, including a scale along which said repeater key is movable from a normal position corresponding to a single registration of each indexed item through a series of positions successively corresponding to increasing numbers of repeated registrations of said indexed item, said means operated by said repeater key being effective as long as said key is away from its normal position, and said repeater key reset mechanism being effective upon each repetition of a registration to return said repeater key to the next position in said series in the direction toward said normal position, so that said indexed item is repeated a number of times determined by the initial displacement of said repeater key from said normal position.

7. In an accounting machine, apparatus for registering individual items and their totals, comprising settable item indexing keys, item registering means, total registering means, a registration key biased to a normal inactive position and movable therefrom to an active position, a selection lever biased to a total registering position and movable therefrom to an item registering position, driving means actuated by movement of the registration key to its active position for driving said item registering means if said selection lever is in its item registering position and for driving said total registering means if said selection lever is in its total registering position, a first locking member connected to said registration key for concurrent movement therewith, a second locking member biased to a first normal position, first cooperating locking portions on said first and second locking members and effective only when said registration key is in its inactive position and said second locking member is in its normal position to lock said registration key in its inactive position, means operated by said item indexing keys for moving said second locking member from said first normal position to a second active position when one of said item indexing keys is set, a selection preparation lever, means including said selection preparation lever actuated by said second locking member upon movement thereof to its second position to move said selection lever to its item registering position, second cooperating locking portions on said first and second locking members and effective when said second locking member is in its second active position and said registration key is moved to its active position to latch said registration key in its active position, means operated by said driving means when a registration is completed to reset said indexing keys and to move second locking member from said second active position to a third active position wherein said second locking portions are separated so that said registration key may return to its normal position, first cooperating abutments on said second locking member and said selection preparation lever for limiting the return movement of the second locking member after an item registration so that it stops in a fourth active position wherein said first cooperating locking positions are not engaged and said registration key is operable to produce a total registration, and second cooperating abutments on said total registration means and said selection preparation lever for preventing engagement of said first cooperating abutments during the return movement of the second locking member after a total registration so that said second locking member returns to its first normal position and said first cooperating locking portions are effective.

8. An accounting machine as defined in claim 7, in which said second locking member is mounted for pivotal movement about a first fixed axis; said means operated by said item indexing keys for moving said second locking member comprises a first arm rotatable about a second fixed axis parallel to said first axis, a pin-and-slot connection between said arm and said second locking member, a pin on each item indexing key, a plate extending along each ordinal row of keys and having cam surfaces engageable by said pins for moving the plate endwise when any key in the row is depressed, a second arm connected to said first arm for concurrent movement therewith and extending adjacent said plate, a lug on said plate adjacent said second arm and effective when said plate is moved endwise by depression of a key to engage said second arm and rotate it and said first arm to move said second locking member to its second position; and said means operated by said driving means to reset the indexing keys to move the second locking member to its third position comprises a cam operated by said driving means, a third arm, means operatively connecting said third arm to said first arm, a follower for said cam carried by said third arm, said cam being effective to reciprocate said arms at the end of each registration and thereby drive said second locking member momentarily to its third position, a second plate adjacent said key-operated plate and said second arm, means connecting said plates for concurrent movement in opposite directions, a lug on said second plate effective to engage said second arm concurrently with the lug on said first plate but on the opposite side of said second arm, said second lug being driven by said second arm as said third arm is reciprocated at the end of a registration so as to drive said first plate toward its original position and reset said indexing keys.

9. An accounting machine as defined in claim 8, in which said means operatively connecting the third arm to the second arm includes a clutch, a cam follower connected to said clutch for movement therewith, and a cam for operating said follower to cause engagement and disengagement of the clutch, and means for operating said cam including a repeater key movable from a normal position corresponding to a single registration of an indexed item through a series of positions successively corresponding to increasing numbers of repeated registrations of said indexed item, said clutch being engaged when the repeater key is in its normal position, said cam being effective upon movement of said repeater key away from said normal position to disengage said clutch, a ratchet connected to said cam for concurrent movement therewith and having teeth corresponding in number to said series of positions, and a pawl connected to said third arm for reciprocation therewith and cooperating with said ratchet to drive said repeater key and said cam back to their normal positions, so that an item set on the indexing keys is registered a number of times determined by the repeater key setting before the indexing keys are reset.

ROBERT GOURDON.

References Cited in the file of this patent

UNITED STATES PATENTS

| Number | Name | Date |
| --- | --- | --- |
| 968,004 | Vincent | Aug. 23, 1910 |
| 1,033,109 | Lundgren | July 23, 1912 |
| 1,050,039 | Peters | Jan. 7, 1913 |
| 1,539,461 | Breitling | May 26, 1925 |
| 1,761,689 | Shipley | June 3, 1930 |
| 1,844,070 | Muller | Feb. 9, 1932 |
| 1,900,103 | Gubelmann | Mar. 7, 1933 |
| 1,965,611 | Sundstrand | July 10, 1934 |
| 2,167,714 | Goldberg | Aug. 1, 1939 |
| 2,261,242 | Fettig | Nov. 4, 1941 |